United States Patent

[11] 3,608,698

| [72] | Inventor | Russell D. Crall<br>Dallas, Tex. |
|---|---|---|
| [21] | Appl. No. | 827,628 |
| [22] | Filed | May 26, 1969 |
| [45] | Patented | Sept. 28, 1971 |
| [73] | Assignee | Stewart Engineering & Equipment Company<br>Richardson, Tex. |

[54] CONVEYOR SYSTEM AND SWITCH CONVEYOR
18 Claims, 11 Drawing Figs.

[52] U.S. Cl. .................................................. 198/81,
198/31 AA
[51] Int. Cl. .................................................. B65g 37/00
[50] Field of Search ......................................... 198/31
(A2), 31 (A3), 81, 19; 302/22, 28

[56] References Cited
UNITED STATES PATENTS
2,580,581  1/1952  Niemitz ........................ 302/28

| 2,739,694 | 3/1956 | Hatch et al. ................. | 198/31 (A3) |
| 3,321,061 | 5/1967 | Huffman et al. .............. | 198/31 (A2) |
| 3,340,992 | 9/1967 | Seragnoli ..................... | 198/31 (A2) |
| 2,736,417 | 2/1956 | Greer .......................... | 198/31 (A3) |

FOREIGN PATENTS
2,736,417  2/1956  Greece ........................ 31 A3/

Primary Examiner—Andres H. Nielsen
Attorney—Walter J. Jagmin

ABSTRACT: A conveyor system having a plurality of switch conveyors for selectively moving articles delivered by a delivery conveyor to a plurality of spaced locations or stations and to a recirculating conveyor if all the stations are not in condition to accept the articles, the recirculating conveyor moving the articles back to the switching conveyors. A switching conveyor usable in the system which has a pair of parallel switch means which are movable to deliver the articles delivered thereto selectively to two different locations.

INVENTOR
Russell D. Crall

INVENTOR
Russell D. Crall

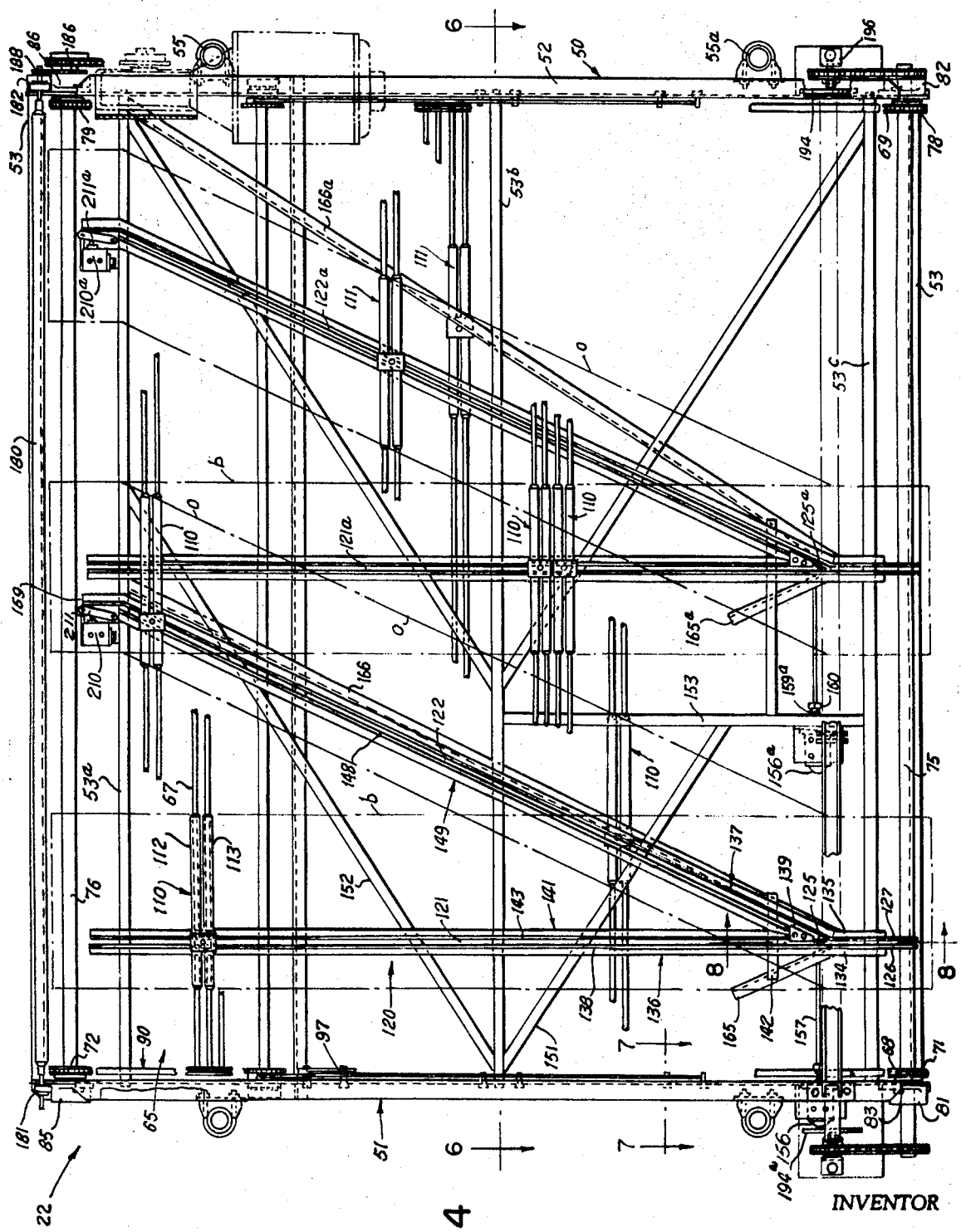

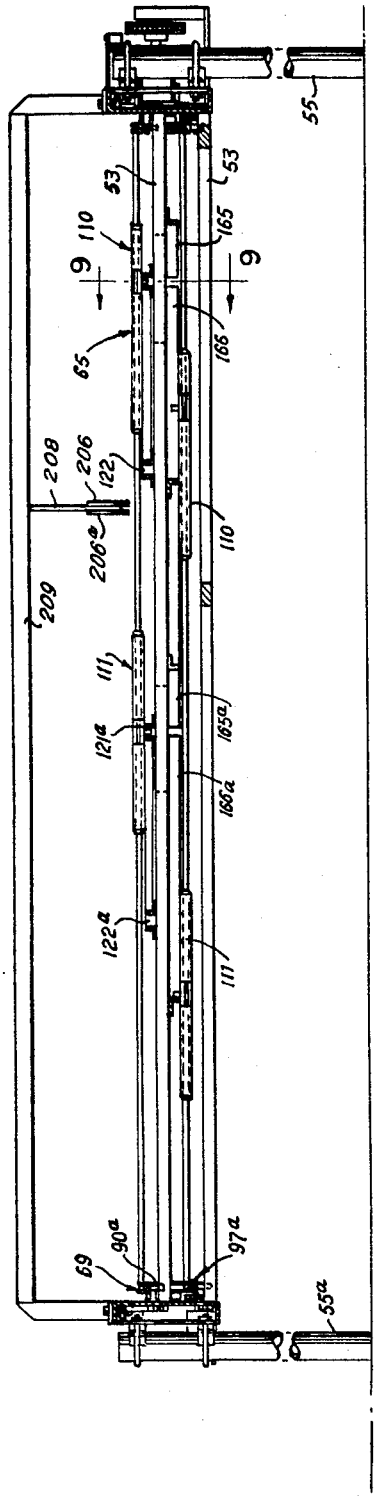
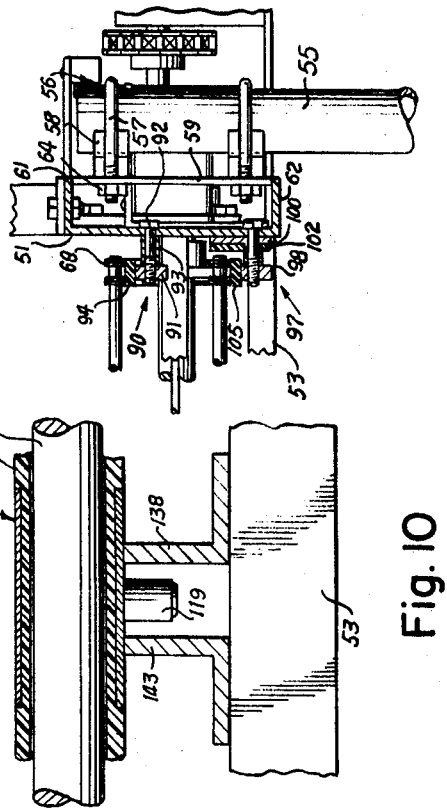
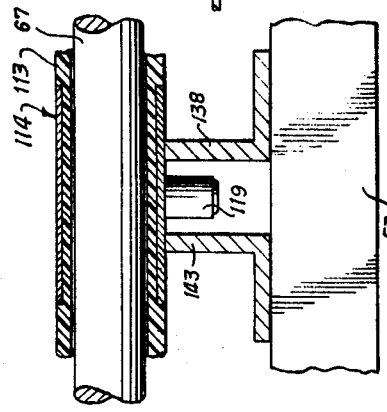
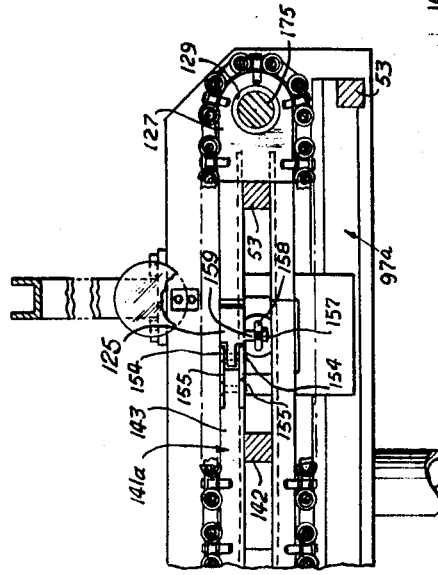
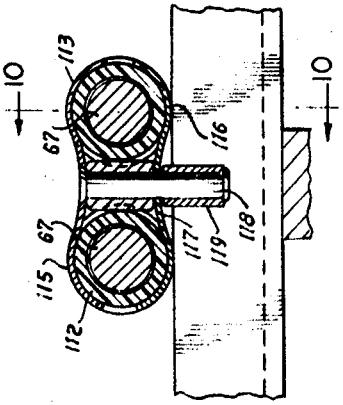
INVENTOR
Russell D. Crall
BY Walter J. Jayn
ATTORNEY

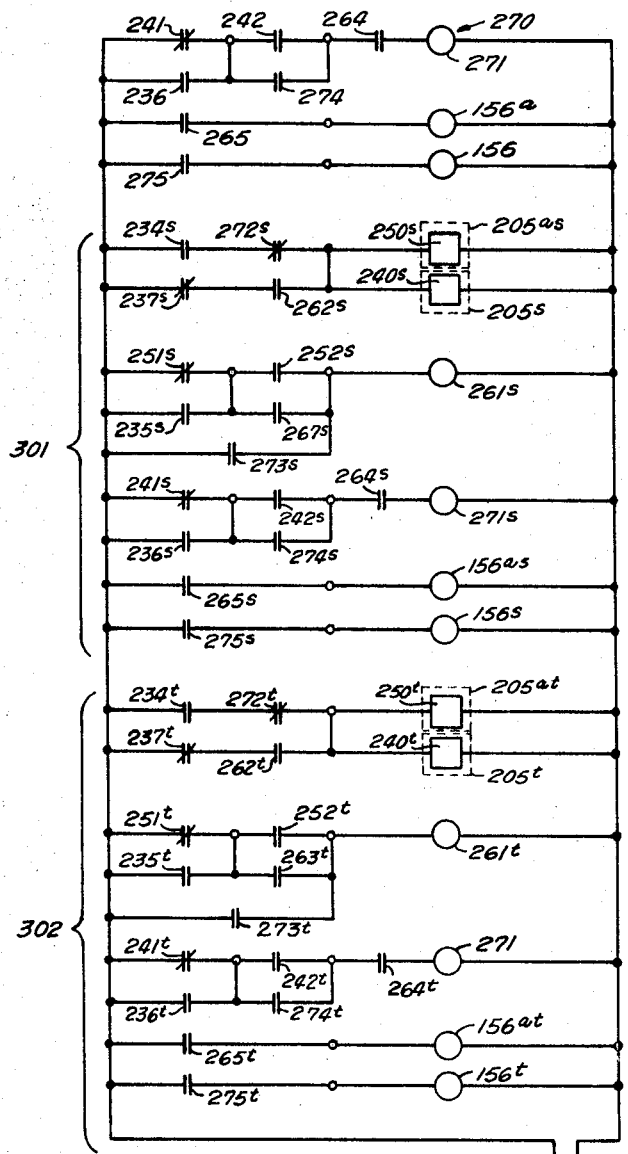
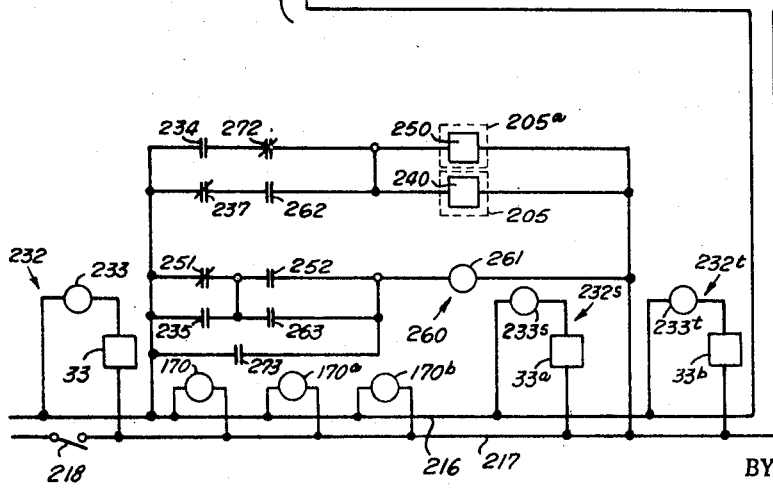
Fig. 11

CONVEYOR SYSTEM AND SWITCH CONVEYOR

This invention relates to a conveyor system and to a switching conveyor for use therein.

An object of this invention is to provide a conveyor system which will deliver articles to a plurality of successive locations or stations.

Another object is to provide a conveyor system wherein the articles are delivered to the first station until it is filled, then to succeeding stations as each station is filled or loaded with articles to a predetermined degree.

Still another object is to provide a conveyor system which will operate automatically to deliver articles successively to successive stations as each station becomes filled with articles and to a recirculating conveyor means when all work stations are full.

Still another object is to provide control means for controlling the operation of the conveyor system in accordance with the load condition at each of the stations.

A further object is to provide a conveyor system having a dual switch means or conveyor preceding each work station which selectively moves the articles to a work station or to a succeeding dual switch means.

A still further object is to provide a conveyor system wherein one switch means of the last switch conveyor in its nonactuated position delivers articles to a storage conveyor in the event the recirculating conveyor becomes full.

Another object is to provide a conveyor system wherein each of the switch conveyors has one switch means for moving articles alternatively to a work station or to the next succeeding switch conveyor and a second switch means for directing the articles delivered either to the first or second switch means of the next succeeding switch conveyor.

Still another object is to provide a dual switch conveyor having a plurality of transverse rods connected at opposite ends to endless chains, two sets of pallets slidably mounted on the rods of the conveyor which constitute two article carrying switch means, and means for selectively causing each set of pallets to travel in either of two preselected predetermined paths to deliver articles carried thereby to two different locations.

Still another object is to provide a dual switch conveyor wherein the delivery end of one preselected path of one set of pallets is at the same location as the delivery end of one preselected path of the other set of pallets whereby either set of pallets may deliver articles to such delivery end when the other set of pallets is not delivering articles to such delivery end.

A further object is to provide a conveyor of the type described having two track systems each providing two paths of movement for the two sets of pallets.

Another object is to provide a conveyor wherein each track system is provided with a switch means for selectively directing the pallets guided thereby in either of two predetermined paths of movement.

Another object is to provide a conveyor system ton for delivering articles to a plurality of successive work stations which has a dual switching means preceding each station and a pair of connector conveyors between each pair of dual switching means, each dual switching means selectively delivering articles to one of its associated connector conveyors and its associated work station or to both of the conveyors.

Still another object is to provide a conveyor system wherein the last of the dual switching means selectively delivers the articles carried thereby either to the last work station and a recirculating conveyor or the recirculating conveyors and a storage conveyor, the recirculating conveyor of the last dual switching means delivering the articles carried thereby to one of the switch means of the first of the dual switching means of the conveyor system.

Additional objects and advantages of the invention will be readily apparent from the reading of the following description of a device constructed in accordance with the invention, and reference to the accompanying drawings, thereof, wherein:

FIG. 4 is a sectional view taken on FIG. 4—4 of FIG. 2, with some parts removed and other broken away;

FIG. 6 is a sectional view taken on line 6—6 of FIG. 4;

FIG. 7 is a sectional view taken on line 7—7 of FIG. 4;

FIG. 8 is an enlarged sectional view taken on line 8—8 of FIG. 4;

FIG. 9 is a sectional view taken on line 9—9 of FIG. 6;

FIG. 10 is a sectional view taken on line 10—10 of FIG. 9;

FIG. 11 is a diagrammatic illustration of the electric control system of the conveyor system.

Figure 1:
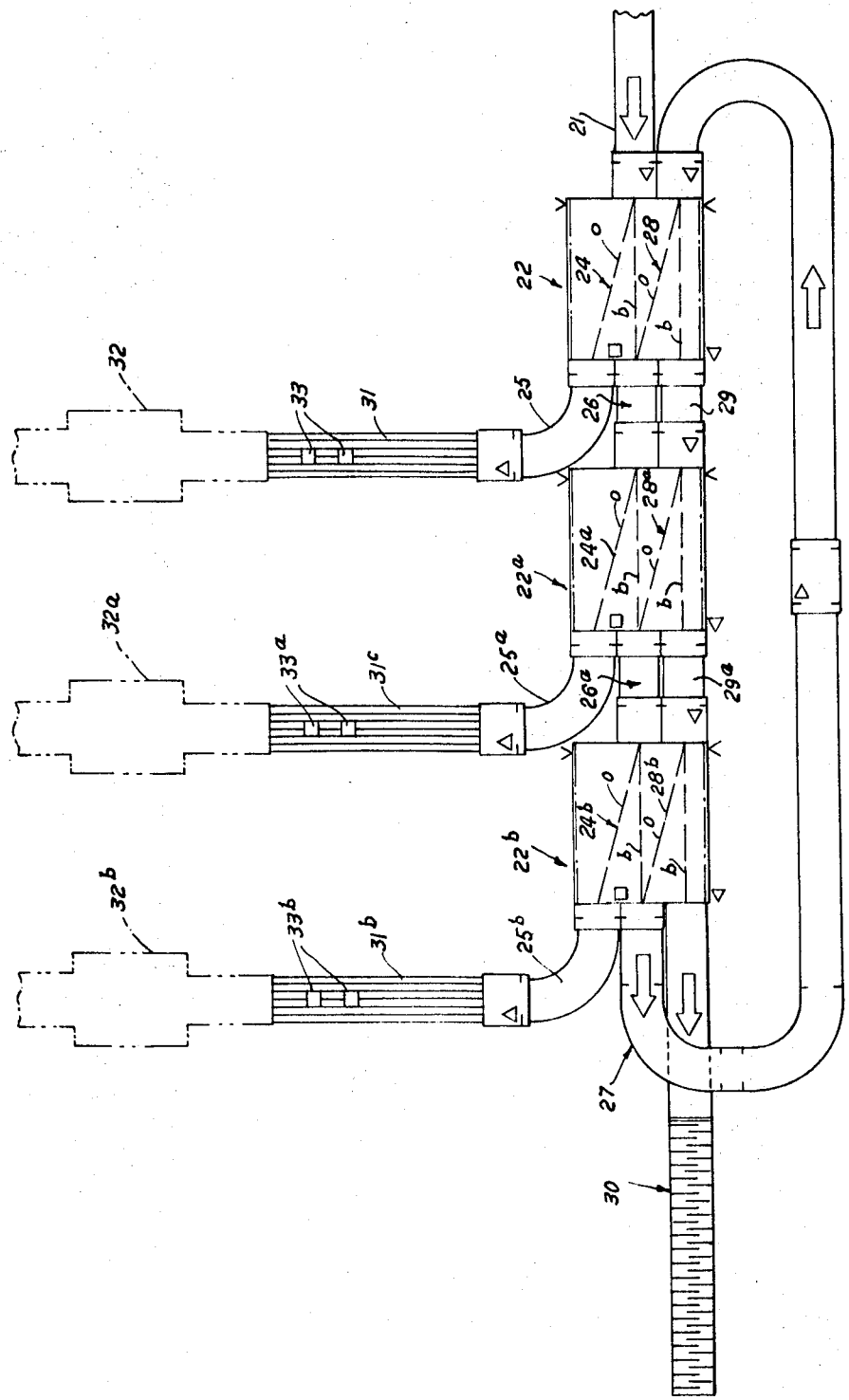
FIG. 1 is a schematic plan view of a conveyor system embodying the invention.
Figure 2:
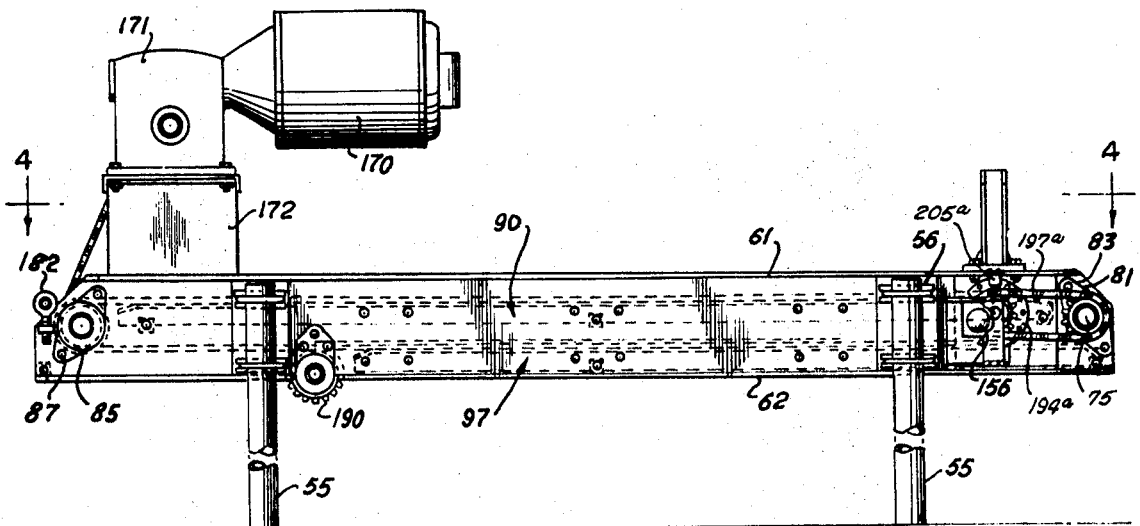
FIG. 2 is one side view of one of the switching conveyors of the conveyor system illustrated in FIG. 1.
Figure 3:
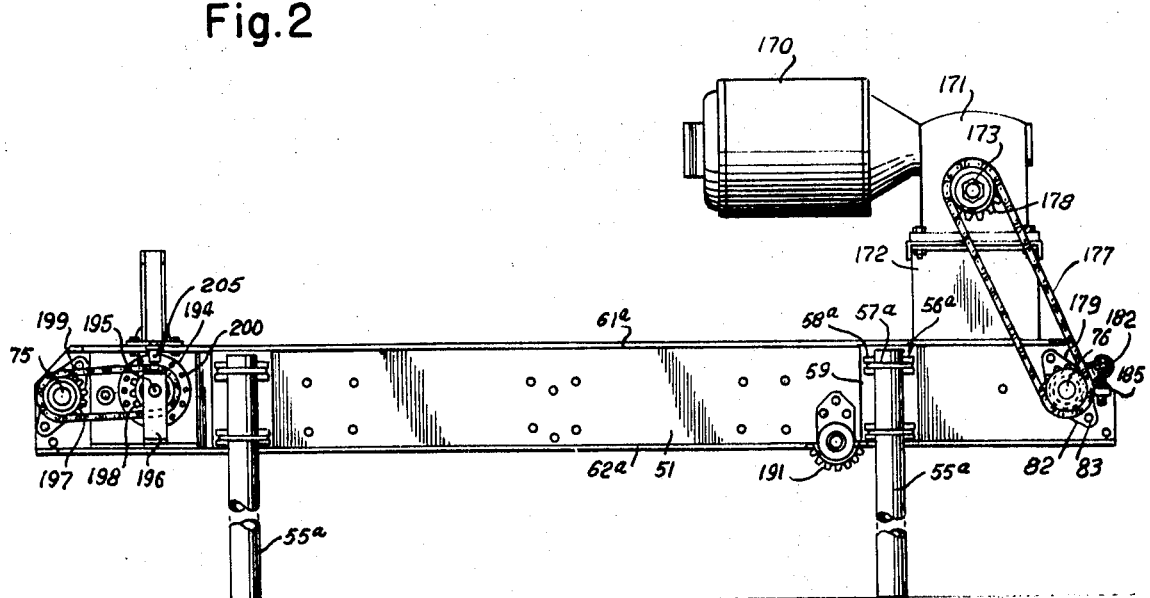
FIG. 3 is the other side view of the conveyor illustrated in FIG. 2.
Figure 5:
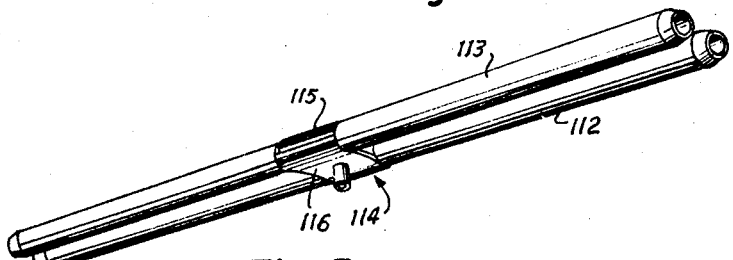
FIG. 5 is a perspective view of one of the pallets of the switching conveyor.

Referring now to the drawings, the illustrated conveyor system 20 embodying the invention includes a delivery conveyor 21 of any suitable type, as for example a gravity feed conveyor, a plurality of switching conveyors 22, 22a and 22b having first switch means 24, 24a and 24b, respectively, for selectively directing the articles being moved thereover to the transfer conveyors 25, 25a and 25b, respectively, or to connector conveyors 26, 26a, respectively, in the cases of the switch means 24 and 24a, or to the circulating and storage conveyor 27 in the case of the switch means 24b.

The articles recirculated by the recirculating conveyor 27 are delivered to the second switch means 28 of the first switch which selectively cause such articles to be moved to the connector conveyors 26 or 29. Similarly the second switch means 28a of the second switching conveyor 22a selectively delivers the articles fed thereto by the connector conveyor 29 to the connector conveyors 26a or 29a. The second switch means 28b of the third switching conveyor 22b delivers the articles fed thereto by the transfer conveyor 29a selectively to the recirculating conveyor 27 or to a storage conveyor 30.

Each of the transfer conveyors 25, 25a and 25b may deliver the articles fed thereto to work stations or article handling devices 31, 31a and 31b, respectively.

For example, the conveyor system may be used in a bakery for delivering bread from cooling conveyors to work stations 31, 31a and 31b and then to bread slicing machines 32, 32a and 32b, each of which slices loaves of bread at a slower rate than the rate of delivery of the loaves of bread over the feed or delivery conveyor 21. For example, each slicing machine may slice a number of loaves of bread per minute which is slightly more than one third the number of loaves delivered each minute by the delivery conveyor.

When any work station, for example, the station 31 is filled with loaves waiting to be sliced which may be detected by suitable sensor means 33, a control means, to be described below, responsive to the sensor means causes the first switch means 24 to move from its operator position "o" to its bypass position "b" to cause the loaves of bread to move to the connector conveyor 26. If the similar sensor means 33a of the second work station indicates that more loaves of bread may be moved over the transfer conveyor 28 toward the slicing machine 32a, a control means responsive thereto causes the first switch means 24a to be moved to its operative position "O" or if the second work station 31a is also filled with loaves of bread, to its bypass position "b" wherein the loaves of bread are caused to be moved to the connector conveyor 26a. The conveyor 26a moves such loaves of bread to the third switch conveyor 22b which, if the sensor means 33b of the transfer conveyor 25b indicate that more loaves may be loaded on the work station 31b, causes the first switch means 24b of the third switch conveyor 22b to be in its operative position o" so that such loaves of bread then move onto the transfer conveyor 25b for movement to the third work station 31b and thence to the third slicing machine 32b.

If the third work station 31b is also loaded, the sensor means 33b and the control means operated thereby causes the first switch means 24b to move to its bypass position "b" and the loaves of bread are then moved onto the recirculating conveyor 27.

The conveyor system 20 is so designed that during normal operation the three slicing machines 32, 32a and 32b can very easily slice the number of loaves of bread at the rate they are being delivered by the delivery conveyor 21. In the event, however, that one or more of the conveyors may be shutdown, as for repair or maintenance, for a short period of time, some of the loaves of bread are passed through all three switching conveyors and to the recirculating conveyor 27. The recirculating conveyor 27, which may be of a continuous belt type, is normally of sufficient capacity that it will store the number of loaves bypassed through all switching conveyors during he normal period of time any one slicing machine is not in operation. Loaves of bread moved to the delivery conveyor 27 are moved thereby back to the first switching conveyor 22. If the first and second switch means 24 and 28 of the first switch conveyor 22 are in their operative position "O," such loaves of bread are delivered by the second switch means 28 to the connector conveyor 26 while at the same time loaves of bread delivered by the delivery conveyor 21 are moved by the first switch means 24 to the transfer conveyor 25. If, however, the first conveyor switch means 24 of the first switch conveyor 22 is in its bypass position "b," its second switch means 28 is also in its bypass position "b" and such loaves of bread are then delivered thereby to the connector conveyor 29. Similarly, if the switch means 24a of the second switch conveyor 22a is in its operative position "o," its second switch means 28a is also in its operative position and causes the loaves of bread delivered thereto by the connector conveyor 29 to be moved to the connector conveyor 26a. If, however, the first switch means 24a is in its bypass position "b," the second switch means 28a is also in its bypass position "b" and causes the loaves of bread to be moved to the transfer conveyor 29a. The second switch means 28b of the third switch conveyor 22b similarly has operative and bypass positions "o" and "b," respectively, and if its first switch means 24b is in its operative position so is its second switch means 28b, thus causing any loaves of bread to be moved onto the recirculating conveyor 27. If, however, the first switch means 24b is in its bypass position, then the second switch means is also in its bypass position and the second switch means then causes any loaves of bread being delivered thereto by the connector conveyor 29a to move onto the storage conveyor 30.

The storage conveyor 30 may be a gravity type conveyor and has sufficient capacity to store a relatively large number of loaves in the event that a prolonged shutdown of one or more of the slicing machines occurs. It will be apparent, of course, that any unsliced loaves of bread accumulating on the storage conveyor 30 will ultimately have to be removed and placed on the recirculating conveyor or the delivery conveyor in order to cause them to be moved to the slicing machines.

It will be apparent that if the rate of delivery of the loaves by the delivery conveyor is quite low, all of the loaves delivered by the delivery conveyor 21 to the switching conveyor 22 will be directed to the transfer conveyor 25 and thus to the first slicing machine 32. If the rate of delivery is greater than the rate at which the loaves can be sliced by the slicing machine 32, when the work station 31 is filled, the first switch means 24 of the first switching conveyor will move to its bypass position thus causing succeeding loaves of bread to be moved to the second switching conveyor and to the second slicing machine 32a. If the rate of delivery is such that the work station 31a is filled, the switch means of the second switching conveyor 22a move to their bypass positions "b" and the loaves of bread will then be delivered to the third switching conveyor which then causes loaves of bread to be moved to the third transfer conveyor 25b and to the slicing machine 32b. If loaves of bread fill the work station 31b, then the switch means of the third bypass conveyor 22b are moved to their bypass positions and the loaves of bread are then moved onto the recirculating conveyor 27.

It will, of course, be apparent that at various times the switch means of one or more switch conveyors may be in their operative positions "o" while the switch means of the other switch conveyors are in their bypass positions. It will be apparent that as the number of loaves on each of the work stations drops below a critical number the switch means of the immediately preceding switch conveyor is moved from its bypass to its operative position as will be explained below. The operation of the switch conveyors embodying the invention is controlled to prevent movement of their switch means between heir operative and bypass positions at the time that loaves of bread are moving off the delivery ends of the switch means to the transfer conveyors as will be explained below.

Referring now particularly to FIGS. 2 through 10 of the drawings, each switching conveyor 22 embodying the invention usable in the conveyor system 20 illustrated in FIG. 1 includes a base frame 50 having a pair of longitudinal channel-shaped side members 51 and 52 which are rigidly connected to one another in parallel aligned relation by a plurality of transversely extending tie rods 53 each of which may have reduced threaded end portions which extend through the webs of the side channel members and secured thereto by means of nuts 54 threaded thereon.

The frame is supported on one side by a pair of vertical posts 55 whose upper ends are secured to the frame by clamp assemblies 56 each of which comprises U-bolts 57 and saddle or spacer blocks 58 secured to a bracket plate 59 extending between and welded to the top and bottom flanges 61 and 62 of the side frame member 51. The threaded inner ends of the U-bolts extend through suitable recesses of the saddle blocks and apertures of the brackets 59 and have nuts 64 threaded thereon. A pair of similar posts 55a are similarly rigidly secured to the other side frame member 52 by similar clamp assemblies 56a whose elements have been provided with the same reference numerals, to which the subscript "a" has been added, as the corresponding elements of the clamp assemblies 56.

A rod conveyor 65 is mounted in the frame for longitudinal continuous movement between the side members of the frame. The conveyor comprises a plurality of transversely extending rods 67 secured at their opposite ends to the endless chains 68 and 69. The chain 68 extends about a pair of rear and front sprockets 71 and 72 rigidly secured to the rear and front shafts 75 and 76. The chain 69 extends about the sprockets 78 and 79 also rigidly secured to the rear and front shifts 75 and 76, respectively. The rear shaft 75 is rotatably journaled in pillow blocks or bearings 81 and 82 secured to the webs of the channel members 51 and 52, respectively, in any suitable manner, as by bolts 83 at the rear ends of the side frame members while the shaft 76 is journaled in similar pillow blocks or bearings 85 and 86 rigidly secured to the side members at their front ends by means of bolts 87.

An upper guide means 90 for supporting the portions of the chain 68 in the top horizontal portion of its path of movement includes a longitudinal support bar 91 secured to the channel member 51 by a plurality of bolts 92 which extend through aligned apertures in the web of the channel member and tubular spacers 93 into threaded bores of the support bar 91. The support bar has a strip or slide of a low friction material 94, such as nylon rigidly secured therein in suitable manner as by bonding and the like. The chain 68 in its lower horizontal path of movement, in which it moves rearwardly from the front sprocket 72 towards the rear sprocket 71, is supported by a similar support assembly 97 which includes a support bar 98 secured to the web by a bolt 99 which extends through suitable apertures in the web of the channel member 51, a bar 100 and a slide strip 102 into threaded bores of the support bar 98. A slide member or strip 105 is rigidly secured to the top of the support bar in any suitable manner, as by bonding. The slide strip 102, which also may be of nylon, is adapted to engage the ends of the rods should the chain tend to move to the left as seen in FIG. 6. The bars 91, 98 and 100 and the slide strip 102 at the locations of any tie bars at their levels are provided with downwardly opening recesses for receiving such tie bars.

The other conveyor chain 69 is similarly supported adjacent the other side frame member 52 by similar means and accordingly, the components of the means for supporting and guiding the other chain are provided with the same reference numerals, to which the subscript "a" has been added as the corresponding components of the means for supporting and guiding the chain 68.

A set of pallets 110 which constitute the second switch means 28 are mounted for sliding movement on the left hand portions of the rods 67 of the conveyor, FIG. 4, and a set of pallets 111, which constitute the first switch means 24, are mounted for sliding movement on the right hand portions of the rods 67.

The pallets 110 are movable on the rods between a position wherein they move directly forward, as in the bypass paths b in the upper forward portion of their paths of movement, or in the paths o wherein they move upwardly and to the right as seen in FIG. 4.

Each of the pallets 110 includes a pair of tubular members 112 and 113 which are slidable on a pair of immediately adjacent rods 67 of the rod conveyor and are clamped together by a clamp assembly 114 which includes top clamp member 115, a lower clamp member 116, a tubular spacer 117 and a rivet 118 which extends downwardly through the two clamp members, the spacer and a guide roller 119 which is disposed below the lower clamp member 116. The roller 119 may be formed of nylon or other suitable low friction material. The inwardly projecting guide rollers 119 of the pallets 110 are guided during their forward movement in the upper part of the path of movement of the conveyor by a track system 120 which provides a channel 121 extending forwardly from the rear shaft 75 to the front shaft 75 and a channel 122 which extends forwardly and to the right from its rear end at which it opens to the channel 121 to a location just rearwardly of the front shaft 76.

A gate 125 is pivotally mounted for movement between its actuated position illustrated in FIG. 4 wherein it extends across the channel 121 to engage the guides 119 of the pallets 110 and cause them to move from the channel 121 to the rear end of the channel 122 and a nonactuated position wherein it closes the rear end of the channel 122 and thus causes the pallet to move forwardly in the channel 121.

The track system includes a pair of vertical plates 126 and 127, provided with apertures 129 through which the rear shaft 75 extends, which are rigidly secured at their front ends by welding to one of the tie bars 53. The vertical plates extend between the rear ends of the horizontal flanges 134 and 135 of angle members 136 and 137 and may be secured thereto by welding. The angle members rest on the top surface of the upper tie bars 53 and are secured thereto by welding. The vertical flanges 138 and 139 of the angle members form the rear portion of the channel 121. An angle member 141 extends from location of the gate 125 and is secured to the two front upper tie bars 53 and a short bar 142 by welding. The vertical flange 143 of the angle member 141 defines the right side of the channel 121 forward of the gate 125.

The inclined channel 122 is defined by the forward portion of the vertical flange 137 and the vertical flange 148 of the angle members 166 and 149, respectively, which rest upon and are rigidly secured to the bar 142 and the two front tie bars 53. The horizontal flanges of these angle members may also rest upon and be secured to the brace bars 151 and 152 which extend divergently from the left-hand side, FIG. 4, of the middle upper tie bar 53 to the front upper tie bar 53a and to a longitudinal brace bar 153 which extends between the middle and rear upper tie bars 53b and 53c.

The gate 125 may be pivotally mounted by a shaft or pin 154 to a pair of horizontal brackets 155 which may be secured as by rivets or the like to the angle members 141 and 149. The gate 125 is movable between its nonactuated position, FIGS. 8 and 4, wherein it closes the rear end of the channel 122 and its actuated position, wherein it closes the channel 121 and connects the rear end of the channel 122 with the rear portion of the channel 121, by a solenoid 156, secured to the web of the side frame member 51 by suitable bracket means whose armature rod 157 extends inwardly through a suitable aperture in the web of the side frame member and is provided at its forward end with an eye 158 in which is received the downwardly dependly lug 159 of the gate 125. When the solenoid 156 is energized, its armature and the armature rod 157 are moved to the left against the resistance of the spring 159 to connect the rear end of the channel 122 to the forward portion of the channel 121 and to close the channel 121.

After the pallets 110 have moved forwardly out of the front end of the channel 121 after having moved forwardly in the bypass portion b of their path of movement in which their guide rollers 119 move in the channel 121, they move downwardly forwardly of the front shaft 76 and then move rearwardly to the channel provided between and by the vertical plates 126 and 127 and then upwardly and back into the rear end of the channel 121. A guide angle member 165 which extends forwardly and to the left, FIG. 4, and then rearwardly in alignment with the plate 126 engages the guide rollers 119 of any pallets which may have moved to the left after leaving the front end of the channel 121 and moves them to the right and into alignment with the channel formed by the two vertical plates 126 and 127. Similarly, a guide angle number 166 which extends rearwardly and to the left, FIG. 4, and then rearwardly in alignment with the plate 127a, engages the guide rollers of the pallets 110 which after moving in the portion o of their path of movement have moved downwardly of the front shaft nd moves them to the left to cause their guide rollers to move between the plates 126 and 127. As a result, each pallet is always guided to the rear end of the channel 121, and then, depending on the position of the gate 125, moves either into the channel 122 or continues direct forward movement in the channel 121.

As the pallets 110 move angularly relative to the frame in the portion o of their path of movement, wherein their guide rollers are disposed in the channel 122, and reach the front end portion of the frame, they are caused to move forwardly by the front end portion 169 of the vertical flange of the angle guide member 137, then move forwardly and downwardly of the front shaft 76, and then rearwardly to the vertical flange of the guide angle member 166 which then guides them to the vertical plates 126 and 127. As a result, regardless of which direction the pallets have moved during their movement in the upper forward movement in the upper portion of their paths of movement, they are always directed back to the vertical channel plates 126 and 127 an thus to rear end of the channel 121 and then will again move either directly forwardly in the bypass portion b of their path of movement or into the portion o.

The pallets 111 of the switch means 24 of the switch means or conveyor 22 are similarly guided in their paths of movement during the rotation of the rod conveyor 65 by a track means 120a and, accordingly, the elements of the track system 120a of the switch means 24 have been provided with the same reference numerals, to which a subscript "a" has been added, as the corresponding elements of the track system 120.

Since the pallets 110 when moving in the portion o of their path of movement must deliver the articles carried thereby at the forward end of their path of movement o to the same location as are delivered articles carried by the pallets 111 when the pallets 111 are moving in the bypass portion b of their paths of movement, the clamp assemblies and guide rollers of the pallets 110 are offset to the left relative to the centers of the pallets 110 while the clamp assemblies and guide rollers of the pallets 111 are centrally positioned relative to the pallets 111. As a result, the front end portion of the portion o of the path of movement of the the pallets 110 coincides with the front end portion of the bypass portion b of movement of the pallets 111.

The conveyor 65 is driven by an electric motor 170 through a speed reducing transmission 171 driven thereby. The output motor and the speed reducing transmission are mounted on the frame by means of a bracket 172. The output shaft 173 of the speed reducing transmission is connected to the front shaft 76 by means of a sprocket chain 177 which extends about sprockets 178 and 179 which are rigidly secured to the shafts 173 and 76 respectively. The switching conveyor 22 may also be provided with a kickoff shaft 180 disposed forwardly of the front end of the rod conveyor and which is rotatably mounted on the front ends of the frame members 51 and 52 by means of bearing assemblies 181 and 182. The kickoff shaft is connected to the front shaft 76 by means of a sprocket chain 185 and sprockets 186 and 187 rigidly secured to the shafts 76 and 180, respectively. The kickoff shaft helps move the articles off the front end of the conveyor and onto the conveyors 25 and 26. The chains 68 and 69 may be held under tension by suitable tension sprockets 190 and 191 adjustably mounted on the channel members 51 and 52, respectively, in any suitable manner.

In order that the gate 125 by moved between its actuated and nonactuated positions only at a time when none of the guide rollers 119 of any of the pallets 110 is at such location relative to the gage that a guide roller would tend to jam the gate and to permit the gate to move between its actuated and nonactuated positions only when no guide roller is in a position to obstruct such movement, a synchronizing disc 194 is provided rigidly mounted on a shaft 195, rotatably mounted on a suitable bracket 196, which is rotated in synchronism with the movement of the rod conveyor by means of a chain 197 and sprockets 198 and 199 rigidly secured to the shafts 195 and 75, respectively. The synchronizing disc 194 is provided with a plurality of apertures 200 which are alignable with a photocell relay unit 205 which includes an electric lamp and a photocell, not shown. The photocell unit may be of the type commercially available as General Electric Company Photoelectric Reflex Control, Model No. 35–7505–PS511A6. When one of the apertures 200 is aligned with the photocell unit 205 light from the lamp is transmitted through such aperture to a mirror 206 and an aperture in the web of the side frame member 51 and back to the photocell provided that a load of bread or other article is not then present on a pallet at the location of the gate 125. The apertures 200 are so related to the roller guides 119 of the pallets 110 that an aperture 200 moves into alignment with the photocell unit only when a guide roller 119 is not present at the location of the gate 125. The mirror is mounted on a depending leg 208 of a U-shaped bracket 209 mounted on the frame side members.

The actuation of the solenoid 156a, and therefore the movement of the gate 125a, is similarly controlled by a synchronizing disc 194a and associated photocell unit 205a which are mounted on the side frame member 51, and accordingly, the elements for controlling the energization and deenergization of the solenoid 156a have been provided with the same reference numerals, to which the subscript "a" has been added, as the corresponding elements of the means for controlling the energization of the solenoid 156.

It will be apparent that if both sets of pallets 110 and 111 have been moving in the bypass portions b of their paths of movement, the gate 125a must be actuated to cause the pallets 111 moving at the rear end of the channel 121a to begin moving into the portion o of their paths of movement before the gate 125 is actuated to cause the pallets 110 to start moving in their portion o of their path of movement in order to prevent such pallets 110 from jamming against pallets 111 which are moving in the portion b of their path of movement. Similarly, if both sets of pallets 110 and 111 are moving in the portions o of their movement, it is necessary that the gate 125 be moved to its nonactuated position before the gate 125a is moved to its nonactuated position to prevent any pallets 111 which begin to move into the portion b of their path of movement from engaging any pallets 110 still moving in the portion b of their path of movement.

It is also desirable that neither gate move between its actuated and its nonactuated position when a loaf of bread is being carried by pallets at the location the gate in order to prevent such loaf, which may be supported by two pallets, from being turned or twisted during its movement. For example, if a loaf of bread is supported on two pallets 110, one of which is moving in the rear end of the portion o of its path of movement and the other pallet is moving in the portion b of its path of movement, the loaf would be turned on the pallets.

The control circuit illustrated in FIG. 11, ensures that the solenoids 156 and 156a are energized and deenergized only in such manner as to prevent all such undesired occurrences.

The main conductors 216 and 217 of the control circuit are connectable to a source of alternating current by a manually operable switch 218. The control circuit includes a relay 232 whose relay winding 233 is connectable across the main conductors by the sensor means 33 whenever it is required that additional loaves of bread be delivered to the work station 31. The work station 31 may be in the form of a chute which is inclined downwardly from the front end of the transfer conveyor 25 so that the loaves of bread delivered by the transfer conveyor 25 will slide down the chute or work station past the sensor means 33 and to the slicing machine 32. The relay winding 233 causes its normally open sets of contacts 234, 235 and 236 to move to their closed positions when it is energized and causes its normally closed set of contacts 237 to move to its open position. The photocell unit 205 includes a relay winding 240 which is energizable only when the light from the lamp of the unit is reflected back to its photocell by the mirror 206. The relay winding 240, when it is energized, causes its normally closed set of c contacts 241 to open and its normally closed set of contacts 242 to open.

Similarly, the relay winding 250 of the photocell unit 205a is energizable only when the light from its lamp is reflected back by the mirror 206a to its photocell and when it is energized causes its normally closed set of contacts 251 to open its normally closed set of contacts 252 to close.

The control circuit also include a relay 260 whose relay winding 261 when energized causes its normally open sets of contacts 262, 263, 264 and 265 to close and a relay 270 which when its winding 271 is energized causes its normally closed sets of contacts 272 to open and its normally open sets of contacts 273, 274 and 275 to close.

Assuming now that a sufficient number of loaves of bread are at the work station 31, the sensor means 33 is holding the relay winding 33 deenergized and the two sets of pallets 110 and 111 are moving in the bypass portions b of their paths of movement. As the number of loaves of bread at the station 31 now decreases below a predetermined number, the sensor device 33 causes the relay winding 233 of the relay 232 to become energized. As a result, its normally open sets of contacts 234, 235 and 236 are closed and its normally closed set of contacts 237 is opened. Each of the photocell relay windings 240 and 250 are now connectable across the main conductors through he closed sets of contacts 234 and 272 and will become energized whenever the light emitted by the lamps is reflected back from the mirrors 206 and 206a, respectively. Energization of the relay winding 240 at this time will not result in the energization of the relay winding 271 since the contacts 264 are still open and the relay winding 261 of the relay 260 must first be energized.

The first time after the energization of the relay winding 233 that a loaf is not present on pallets 111 at the location of the gate 125a, the relay winding 250 of the photocell unit 205a will become energized as light from its lamp is reflected back to its photocell from the mirror 206a and through an aperture of its synchronizing disc 194a since it is now connectable across the main conductors through the closed sets of contacts 234 and 272 and will cause energization of the relay winding 261 through the now closed sets of contacts 235 and 252. Energization of the relay winding 261 then causes energization of the solenoid 156 as the set of contacts 265 is closed and the solenoid 156a is connected across the main conductors 216 and 217 and the pallets 111 as they move forward in the rear part of the channel 121a will be diverted by the gate 125a into the channel 122 and the loaves of bread being transported by the pallets 111 will be delivered to the transfer conveyor 25.

When the relay winding 261 is energized, it causes a holding circuit to be completed through the now closed sets of contacts 235 and 263 so that the relay winding 261 will now remain energized even though the photocell relay winding 250 becomes deenergized after its momentary energization.

At any time thereafter when a loaf of bread is not present on pallets 110 at the location of the gate 125 and an aperture 200 of the synchronizing disc 194 moves into alignment with the photocell unit 205, the winding 240 of the photocell unit 205 will become energized since it will now be connected across the conductors through the closed sets of contacts 234 and 272. Energization of the relay winding 240 will now cause the set of contacts 242 to close and the relay winding 271 to be connected across the conductors through the closed sets of contacts 236 and 242 causing its contacts 275 to connect the solenoid 156 across the main conductors. The gate 125 will then be moved to its actuated position by the solenoid 156 and any loaves delivered to the pallets 110 are moved thereby to the connector conveyor 26.

When the winding 271 is energized, it causes a holding circuit to be completed through the now closed contacts 236 and 274 so that the relay winding 261 will now remain energized even through the photocell relay winding 240 becomes deenergized after its momentary energization. The photocell units 205 and 205a are disconnected from across the nonconductors when the relay winding 271 is energized and opens its normally closed set of contacts 272.

The energization of the relay winding 271 caused the closure of its normally open contacts 273 and the establishment of a holding circuit for the relay winding 261 so that the winding 261 will now remain energized as long as he winding 271, and therefore the solenoid 156a, remain energized. As a result, the solenoid 156a must be deenergized before there can be any deenergization of the solenoid 156.

Once a predetermined number of loaves of bread have accumulated at the work station 31, the sensor means 33 will deenergize the winding 233 of the relay 232, thus causing its set of contacts 237 to move to their closed position and its sets of contacts 234, 235 and 236 to move to their open positions. The winding 271 will now remain connected across the main conductors, even though the winding 233 has been deenergized, by the now closed sets of contacts 241 and 274.

The relay winding 240 of the photocell unit 205 is now in condition to become energized and becomes energized through the closed sets of contacts 237 and 262 when a loaf of bread is not present at the location of the gate 125, an aperture of the synchronizing disc 194 moves into alignment with the photocell unit 205 and a beam of light is reflected from its lamp back to its photocell. When the relay winding 240 is thus again energized, it opens its normally closed set of contacts 241 thus disconnecting the winding 271 from across the main conductors. As a result, its sets of contacts 273, 274 and 275 open, the solenoid 156 is deenergized and the gate 125 is moved to its nonactuated position so that the pallets 110 will now be directed to the bypass portion b of their path of movement by the gate 125.

The deenergization of the winding 271 and the opening of the contacts 273 now opens the holding circuit established by the contacts 273 of the winding 261 so that the relay winding 261 is now remains connected across the main conductor only through the closed sets of contacts 251 and 263. Since the closing of the contacts 237 permit the relay winding 250 to become energized, the next time no loaf of bread is on the pallets 111 at the location of the gate 125a and an aperture of the synchronizing disc 194a moves into alignment with the photocell 205a, the opening of the contacts 251 causes deenergization of the relay winding 261 thus causing opening of its sets of contacts 262, 263 and 265. The opening of the contacts 265 now causes the solenoid 156a to be deenergized and the gate 125a moves back to its nonactuated position. As a result, the pallets 111 are now moved straight forward in the bypass portion b of their path of movement, and to the connector conveyor 26. The control circuits 301 and 302 for the switching means or conveyors 22a and 22b, respectively, being identical in all respects to the above described circuit for the switching means or conveyor 22, the elements of the control circuits 22a and 22b have been provided with the same reference numerals, to which subscripts "a" and "b", respectively, have been added, as the corresponding elements of the control circuit of the conveyor 22.

The motors 170, 170a and 170b of the conveyors 22, 22a and 22b may be of course connected across the main conductors 216 and 217 by the manually operated switch 218.

It will now be apparent that the loaves of bread delivered by the feed conveyor 21 to the first switch means 24, i.e. set of pallets 111, of the first switching means 22 may be directed or moved by the pallets 111 either to the transfer conveyor 25 and thus to the work station 31 if the sensor device 33 indicates that loaves of bread should be delivered to the work station 31, or to the connector conveyor 26, and that when the first switch means 24 is moving the articles to the transfer conveyor 25 the other switch means 28 is moving any articles delivered thereto by the recirculating conveyor 27 to the connector conveyor 26. If the sensor device 33 indicates that no further loaves of bread should be delivered to the work station 31, both of the switch means 24 and 28 of the first transfer conveyor move in their bypass portions b of their paths of movement, thus transporting any loaves of bread delivered thereto by the feed conveyor 21 and the recirculating conveyor 27, respectively, to the connector conveyors 26 and 29, respectively.

It will be apparent that each of the dual switching conveyors 22, 22a and 22b operate independently of the other conveyors each being controlled solely by operation of its associated sensor means 33, 33a and 33b.

The work stations 31, 31a and 31b are of sufficient capacity so that if its associated sensor means 33 indicates that no additional loaves of bread should be delivered to the work station, a certain additional number may be accommodated by the work station since, as was described above if a loaf of bread is present on a pallet at the location of the gate 125 or 125a, the gate 125a will not immediately move to its nonactuated position and additional loaves of bread will be delivered to the transfer conveyor 25 and thereby to the work station 31 until such time as no loaf of bread is present at the location of the gate 125 after the gate 125a has moved to its nonactuated position.

If the conveyors are provided with the switches 210 to control the motors driving the transfer conveyor 25, the transfer conveyor will stop once the last loaf of bread which has moved through the portion of the path of movement of the pallets 111, has been delivered to the rear end of the transfer conveyor 25.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A conveyor system for delivering articles to a plurality of successive stations, said system including: a plurality of dual switching means with a dual switching means preceding each station, each dual switching means having two switch means; and a pair of parallel connector conveyors extending between each pair of adjacent dual switching means, one of said switch means of each dual switching means selectively delivering articles carried thereby to its associated work station or one of its associated pair of connector conveyors and the other of said switch means of each dual switching means delivering articles carried thereby selectively to either of its associate pair of connector conveyors, one of said connector conveyors of each pair of connector conveyors receiving articles delivered thereto by either of the switch means of the preceding dual switching means of the system and delivering the articles to said one of said switch means of the next dual switching means, and other of said connector conveyors of each pair of connector conveyors receiving articles delivered thereto by said other of the switch means of the preceding dual switching means and delivering it to said other of the switch means of the next dual switching means.

2. The conveyor system of claim 1, and a recirculating conveyor associated with the last of the dual switching means of the conveyor system, said recirculating conveyor connecting said one of the switch means of the last dual switching means with said other of the switch means of the first dual switching means of the conveyor system.

3. The conveyor system of claim 2, and storage means for receiving articles delivered by the other of said switch means of the last dual switching means of the conveyor system.

4. The conveyor system of claim 3, wherein the other of said switch means of the last dual switching means selectively deliver articles carried thereby to said recirculating conveyor or said storage means.

5. The conveyor system of claim 4, wherein said other of said switch means of the last dual switching means delivers articles carried thereby to said recirculating conveyor when said one of said switch means of said last dual switching means is delivering articles to its associated station and said other of said switch means of said last dual switching means delivers articles carried thereby to said storage means when said one of said dual switch means of said last dual switching means is delivering articles carried thereby to said recirculating conveyor.

6. A conveyor system for moving articles to a plurality of successive stations, said system including: a plurality of dual switching means each having a first and a second switch means, a first of said dual switching means being disposed before the first station and intermediate ones of said dual switching means being disposed between each pair of adjacent stations; a pair of parallel connector conveyors including a first and a second connector conveyor extending between adjacent spaced pairs of dual switching means for delivering articles from a preceding dual switch means to the next dual switching means said first switch means of said first and intermediate dual switching means selectively moving articles carried thereby to a first connector conveyor or its associated work station, and a second switch means of each of said first and intermediate dual switching means selectively moving articles carried thereby to a first connector conveyor or a second connector conveyor, said second switch means of each first and intermediate dual switching means moving articles carried thereby to a first connector conveyor when said first switch means is moving articles carried thereby to its associated work station and to a second connector conveyor when said first switch means is moving articles to said first connector conveyor said first and second connector conveyors delivering articles carried thereby to said first and second switch means, respectively, of the next dual switching means.

7. The conveyor system of claim 6, and a recirculating conveyor and a storage conveyor for receiving articles moved by the last of said dual switching means, said first switch means of said last dual switching means selectively moving articles carried thereby to the last station or said recirculating conveyor, said second switch means of said last dual switching means selectively moving articles carried thereby to said recirculating conveyor or said storage means.

8. The conveyor system of claim 7, said recirculating conveyor moving articles carried thereby to said second switch means of the first of said dual switching means of the system.

9. The conveyor system of claim 8, and means for delivering articles to be delivered to the stations to said first switch means of the first of said dual switching means of the system.

10. The conveyor system of claim 9, wherein each of said dual switching means comprises: a support means; a rod conveyor mounted for movement in a closed path having an upper horizontal forwardly moving portion and a lower horizontal rearwardly moving portion, said conveyor comprising a pair of aligned flexible members, a plurality of longitudinally spaced transverse rods secured at opposite ends to said flexible members and two sets of pallets mounted on said rods and movable transversely thereon between said flexible members; and track means carried by said support means for selectively causing each of said sets of pallets in the upper portion of the path of said movement to move selectively in a first forwardly extending first path and angularly and forwardly in a second path.

11. The conveyor system of claim 10, wherein the front delivery end of one of said sets of pallets in its second path movement coincides with the front delivery end of the other of said sets of pallets in its first path of movement.

12. The conveyor system of claim 11, and gate means operatively associated with each of said track means for selectively directing the pallets of each set of each conveyor into said first and second paths of movement.

13. A switching conveyor including: support means; a conveyor mounted for movement in a closed path having an upper horizontal forwardly moving portion and a lower horizontal rearwardly moving portion; said conveyor comprising a pair of aligned endless flexible members, a plurality of transverse rods secured at opposite ends to said flexible members; two sets of pallets mounted on said rods and movable thereon between said flexible members; and track means carried by support means for selectively causing pallets of each of said sets of pallets when in the upper portion of the path of movement of said conveyor to move either in a first straight longitudinal path parallel to said flexible members or in a second path angularly and forwardly.

14. The conveyor of claim 13, wherein the delivery end of one of said sets of pallets at the forward end of its angular path coincides with the first delivery end of the other set of pallets when they are in the first longitudinal portion of the path of movement.

15. The switching conveyor of claim 14, and gate means operatively associated with each of said track systems for selectively directing the pallets of each set into its first and second paths of movement.

16. The switching conveyor of claim 15 wherein each of said pallets comprises a pair of tubular members slidably disposed on adjacent pair of rods and guide means extending inwardly from each of said pallets and engageable with said track means.

17. The switching conveyor of claim 16, and means operatively associated with said gate means and said sets of pallets for controlling operation of said gate means preventing the pallets of one set from engaging the pallets of the other set.

18. The switching conveyor of claim 15, and means operatively associated with said gate means and said sets of pallets for controlling operation of said gate means preventing the pallets of one set from engaging the pallets of the other set.